US012567743B2

(12) United States Patent
Muenz et al.

(10) Patent No.: US 12,567,743 B2
(45) Date of Patent: Mar. 3, 2026

(54) INTEGRAL VOLTAGE CONTROL OF A DISTRIBUTION FEEDER TO AVOID VOLTAGE VIOLATIONS

(71) Applicant: Siemens Aktiengesellschaft, Munich (DE)

(72) Inventors: Ulrich Muenz, Princeton, NJ (US); Christian Heuer, Seevetal (DE)

(73) Assignee: Siemens Aktiengesellschaft, Munich (DE)

( * ) Notice: Subject to any disclaimer, the term of this patent is extended or adjusted under 35 U.S.C. 154(b) by 375 days.

(21) Appl. No.: 18/454,842

(22) Filed: Aug. 24, 2023

(65) Prior Publication Data

US 2024/0088654 A1 Mar. 14, 2024

Related U.S. Application Data

(60) Provisional application No. 63/374,953, filed on Sep. 8, 2022.

(51) Int. Cl.
*H02J 3/00* (2006.01)
*H02J 3/001* (2026.01)
*H02J 3/38* (2006.01)

(52) U.S. Cl.
CPC .......... *H02J 3/00125* (2020.01); *H02J 3/381* (2013.01); *H02J 2203/20* (2020.01); *H02J 2300/24* (2020.01); *H02J 2300/28* (2020.01)

(58) Field of Classification Search
CPC .... H02J 3/00125; H02J 3/381; H02J 2203/20; H02J 2300/24; H02J 2300/28; H02J 2300/20; H02J 3/1807
See application file for complete search history.

(56) References Cited

U.S. PATENT DOCUMENTS 11,387,651 B2 7/2022 Samaan et al.
2022/0099754 A1* 3/2022 Cintuglu ............. H02J 3/00125

OTHER PUBLICATIONS

IEEE paper titled "Coordinated Voltage Control Strategy for Voltage Regulators and Voltage Source Converters Integrated Distribution System", by Afshin Samadi,et al., published in 2014, [online], retrieved from <https://ieeexplore.ieee.org/abstract/document/6727491> (Year: 2014).*

(Continued)

*Primary Examiner* — Charles Cai

(57) ABSTRACT

A method for controlling voltage in a feeder of a distribution system having a plurality of DERs includes executing a feedback control using an integral controller. A voltage signal is generated using measured or estimated voltages at multiple locations along the feeder. An error is determined between the voltage signal and a defined voltage limit. The error is input to a controller including an integrator to generate a control action to counteract the error. The control action is distributed among at least some controllable DERs, from the plurality of DERs, that are capable of responding to the control action by generating actuation signals for absorbing reactive power from or injecting reactive power into the feeder, and/or for reducing active power or increasing active power in the feeder. The control action continues to increase until the voltage signal reaches the defined voltage limit, to thereby control voltage in the feeder.

15 Claims, 2 Drawing Sheets

(56) References Cited

OTHER PUBLICATIONS

Almasalma, Hamada et al; "Peer-to-peer-based integrated grid voltage support function for smart photovoltaic inverters"; applied energy; vol. 239; published: Feb. 10, 2019; pp. 1037-1048; XP085629843; ISSN: 0306-2619; DOI: 10.1016/J.APENERGY. 2019.01.249.

Chaudhary, Sanjay K et al; "Enhancing the Capacity of the AC Distribution System Using DC Interlinks-A Step Toward Future DC"; IEEE Transactions on smart grid; vol. 6; No. 4; published: Jul. 1, 2015; pp. 1722-1729; XP011585305; ISSN: 1949-3053; DOI: 10.1109/TSG.2015.2404313.

Christakou, Konstantina et al.; "Primary Voltage Control in Active Distribution Networks via Broadcast Signals: The Case of Distributed Storage"; IEEE Transactions on smart grid; vol. 5; No. 5; published: Sep. 1, 2014; pp. 2314-2325; XP011558509; ISSN: 1949-3053; DOI: 10.1109/TSG.2014.2319303.

* cited by examiner

INTEGRAL VOLTAGE CONTROL OF A DISTRIBUTION FEEDER TO AVOID VOLTAGE VIOLATIONS

TECHNICAL FIELD

The present disclosure relates to voltage control in power distribution systems including distributed energy resources.

BACKGROUND

A distribution system connects residential and commercial customers to a power transmission system. Traditionally, the customer loads have been served from electricity generated at the transmission level. With increasing penetration of distributed energy resources (DER) like photovoltaic (PV) systems, wind turbines, battery energy storage systems (BESS), electrical heating/cooling systems, electric vehicle (EV) charging systems, etc., there are more and more active elements in today's distribution systems which require active management. One of the main challenges with increasing DER integration in distribution systems is voltage control. At times with high generation, e.g., from PV infeed, the voltage increases and can easily exceed the allowed upper voltage limit. Similarly, at times with high load, e.g., from EV charging systems, the voltage may drop below the allowed lower voltage limit.

In recent times, DERs are often connected to power networks via inverters which possess voltage regulating functions. For example, DER inverters can supply reactive power locally to the distribution system based on local voltage measurements. This has become state of the art of many DER connection standards and grid codes. Other solutions to the problem of voltage control, developed mainly by the academic community, rely on solving an optimization problem that determines active and reactive power setpoints for some of the DERs to maintain the voltage within its limits. The optimization is based on a power system model of the distribution system. Due to the dynamic nature of DER integration, the availability of an updated power system model can be challenging in practice.

SUMMARY

The present disclosure solves the technical problem of maintaining voltage in a distribution system feeder within defined limits by controlling at least some of the DERs in the distribution system, based on integral voltage control. The disclosed methodology can achieve a high integration of DERs without requiring a power system model of the distribution system or any additional hardware.

A first aspect of the disclosure provides a method for controlling voltage in a feeder of a distribution system including a plurality of DERs by executing a feedback control. The method comprises generating a voltage signal using measured or estimated voltages at multiple locations along the feeder. The method further comprises determining an error between the voltage signal and a defined voltage limit. The method further comprises inputting the error to a controller comprising an integrator to generate a control action to counteract the error. The method further comprises distributing the control action among at least some controllable DERs, from the plurality of DERs, that are capable of responding to the control action by generating actuation signals for absorbing reactive power from or injecting reactive power into the feeder, and/or for reducing active power or increasing active power in the feeder. The control action continues to increase until the voltage signal reaches the defined voltage limit, to thereby control voltage in the feeder.

Further aspects of the disclosure are directed to computing systems and computer program products including instructions executable by a processor to carry out the above-described method and its optional embodiments.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

DETAILED DESCRIPTION

Figure 1:
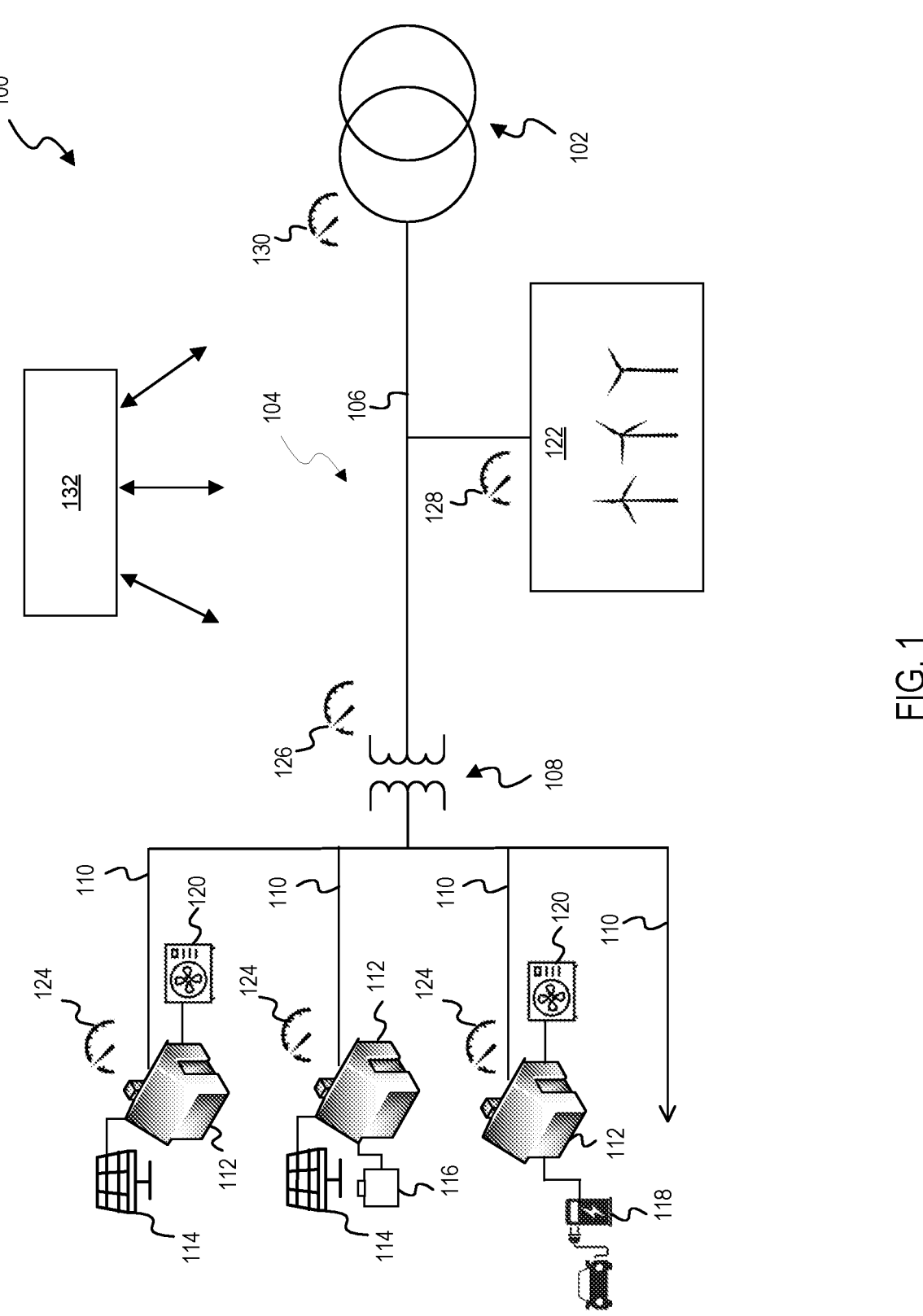
FIG. 1 illustrates an example of a power distribution system having a number of DERs, wherein aspects of the present disclosure can be implemented for voltage control in a distribution feeder.

Aspects of the present disclosure provide technological features for realizing voltage control in a distribution system including a number of DERs. DERs include electricity supply or demand resources that are interconnected to a distribution grid. DERs may include small-scale resources located at sites of energy consumption (residential or commercial), such as rooftop PV systems, BESS, EV charging systems, electrical heating and cooling systems, among others. DERs can also include utility scale resources connected to a distribution feeder, such as PV power stations (solar parks), wind parks, etc. A high penetration of DERs can cause high fluctuation of power generation and/or consumption, which can lead to voltage violations in a distribution feeder. Many of the DERs are connected to the distribution grid via inverters. DER inverters, in addition to their primary function of providing active power to the loads or to the grid, can also provide grid services such as voltage regulation, reactive power provisioning, voltage and frequency ride-through, among others, ensuring optimal performance of the grid and high quality and reliability of electric service to the customers.

The disclosed methodology provides integral voltage control in a distribution feeder leveraging the voltage regulating functionalities of some DERs, referred to as "controllable" DERs. In particular, voltage regulating functions of DER inverters based on absorption and injection of reactive power (e.g., as described in the IEEE 1547 standard) may be suitably utilized by the disclosed methodology. The disclosed methodology uses a controller comprising an integrator that generates a control action by integrating an error between a voltage signal and a defined voltage limit, multiplied by a gain. Since the input to an integral controller is a scalar, the voltage signal may be a scalar, derived from measured or estimated voltages at multiple locations along a feeder. A "feeder" may comprise a distribution line emanating from a distribution substation, including branches that supply electricity to a number of consumption locations. As is typical for power systems, the measured or estimated voltages may be computed "per unit", i.e., normalized with respect to a nominal voltage in the feeder at the respective location (hereinafter referred to as "nominal feeder voltage"). The control action, which may also be a scalar, is distributed among at least some of the controllable DERs that are instantly capable of responding to the control action by generating actuation signals for absorbing reactive power from or injecting reactive power into the feeder, and/or for reducing active power or increasing active power in the feeder. The control action continues to increase until the voltage signal reaches the defined voltage limit, to thereby control voltage in the feeder. The "increase" in the control action refers to an increase in magnitude irrespective of the sign, i.e., may refer to an increase in positive control action or, as in some embodiments, an increase in negative control action. The methodology can be used to maintain the voltage in the feeder between defined upper and lower voltage limits.

Compared to known solutions, the disclosed methodology can achieve a higher integration of DERs without requiring a power system model of the distribution system or any additional hardware. The integral controller may only become active when a voltage limit is violated, thus avoiding control actions until a problem actually exists. The lack of the power system model may be compensated by the integrating action of the controller, which ensures that the control action continues to increase until the voltage signal reaches voltage limit, without prior knowledge of the controllable DERs that can respond to the control action.

An additional technical problem solved by the disclosed methodology is that that not all of the controllable DERs may be available to respond to a control action at any given time. For example, if the DER is an EV charging system, then it can only modify its load if an EV is actually connected to the EV charging system. Furthermore, even if an EV is connected to the EV charging system, the EV charging system may not be able to modify its load if the EV owner chooses to override a command to reduce charging. If some of the controllable DERs are temporarily not responsive, the integral action of the controller ensures that the control action continues to increase, getting distributed among the remaining controllable DERs that are capable of responding to it, until the voltage limit is reached.

FIG. 1 shows a non-limiting example of a distribution system where the disclosed methodology can be implemented. In the shown example, the distribution system 100 has a radial tree topology. As shown, the distribution system 100 may include a distribution substation 102 that may receive power from a transmission network via a step-down transformer. The distribution system 100 may include a number of feeders 104 (only one of which is shown) that emanate from the substation 102, serving electricity to end customers. As shown, the feeder 104 may include a main feeder portion 106 that carries the stepped-down voltage from the distribution substation 102 to a distribution transformer 108. The distribution transformer 108 typically provides the final voltage transformation in the distribution system 100, stepping down the voltage used in the main feeder portion 106 to the level used by end customers. The feeder 104 may include a number of feeder branches 110 that carry the output from the distribution transformer 108 to end customers at a number of consumption locations 112, which may include residential or commercial sites, among others.

The distribution system 100 may include a number of DERs installed at different consumption locations 112. For example, as shown in FIG. 1, a residential or commercial site 112 may have installed thereon one or more of: a rooftop PV system 114, a BESS 116 (which may be often coupled to a PV system 114), an EV charging system 118, an electrical heating and cooling system 120, among other DERs. In some examples, the distribution system 100 may also include DERs comprising utility-scale generators, such as a wind park 122 or a PV station (not shown), which may, for example, be coupled to the feeder 104.

To ensure that the voltage in the feeder 104 is within defined limits, voltage may be measured or estimated at multiple points along the feeder 104. For example, as shown, meters may be installed for real-time voltage measurements at various locations, including meters 124 installed at the consumption locations 112, meter 126 installed at the distribution transformer 108, meter 128 installed at the wind park 122, and meter 130 installed at the distribution substation 102. For locations where real-time voltage measurements are not available, estimated voltages may be used. The estimated voltages at such locations may be computed based on real-time voltage measurements at certain other locations. For example, real-time voltage measurements may not be available at many of the residential consumption locations 112. In this case, the voltages at those consumption locations 112 may be estimated from real-time voltage measurements at the substation 102, e.g., using a neural network trained on historical voltage measurement data for those consumption locations 112.

The measured voltages may be communicated by the available meters 124, 126, 128, 130 to a grid control system 132, which may include one or more integral controllers (described hereinafter) to generate a control action if the voltage in the feeder 104 violates a voltage limit. The voltage violation may occur anywhere in the feeder 104, between and including the feeder head (substation 102) and feeder tail (consumption locations 112). The grid control system 132 may communicate the control action to the DERs 114, 116, 118, 120, 122. For example, the control action may be communicated by the grid control system 132 to the DERs 114, 116, 118, 120, 122 via point-to-point communication, or via broadcasting. The control action may be distributed among some or all of the DERs 114, 116, 118, 120, 122, which are capable of generating actuation signals (e.g., via DER inverters) responsive to the control action at any given time, to maintain the voltage in the feeder 104 within defined limits. For example, if the voltage in the feeder 104 exceeds a defined upper voltage limit, at least some of the controllable DERs may generate actuation signals responsive to the control action to increase the absorption of reactive power in the feeder 104 (e.g., with a lagging power factor setting of the DER inverter) to locally reduce voltage, or to reduce active power in the feeder 104 (e.g., by reducing active power infeed from PV systems or by increasing active power load). If the voltage in the feeder 104 falls below a defined lower voltage limit, at least some of the controllable DERs may generate actuation signals responsive to the control action to increase the injection of reactive power in the feeder 104 (e.g., with a leading power factor setting of the DER inverter) to locally increase voltage, or to increase active power in the feeder 104 (e.g., by reducing active power load).

Figure 2:
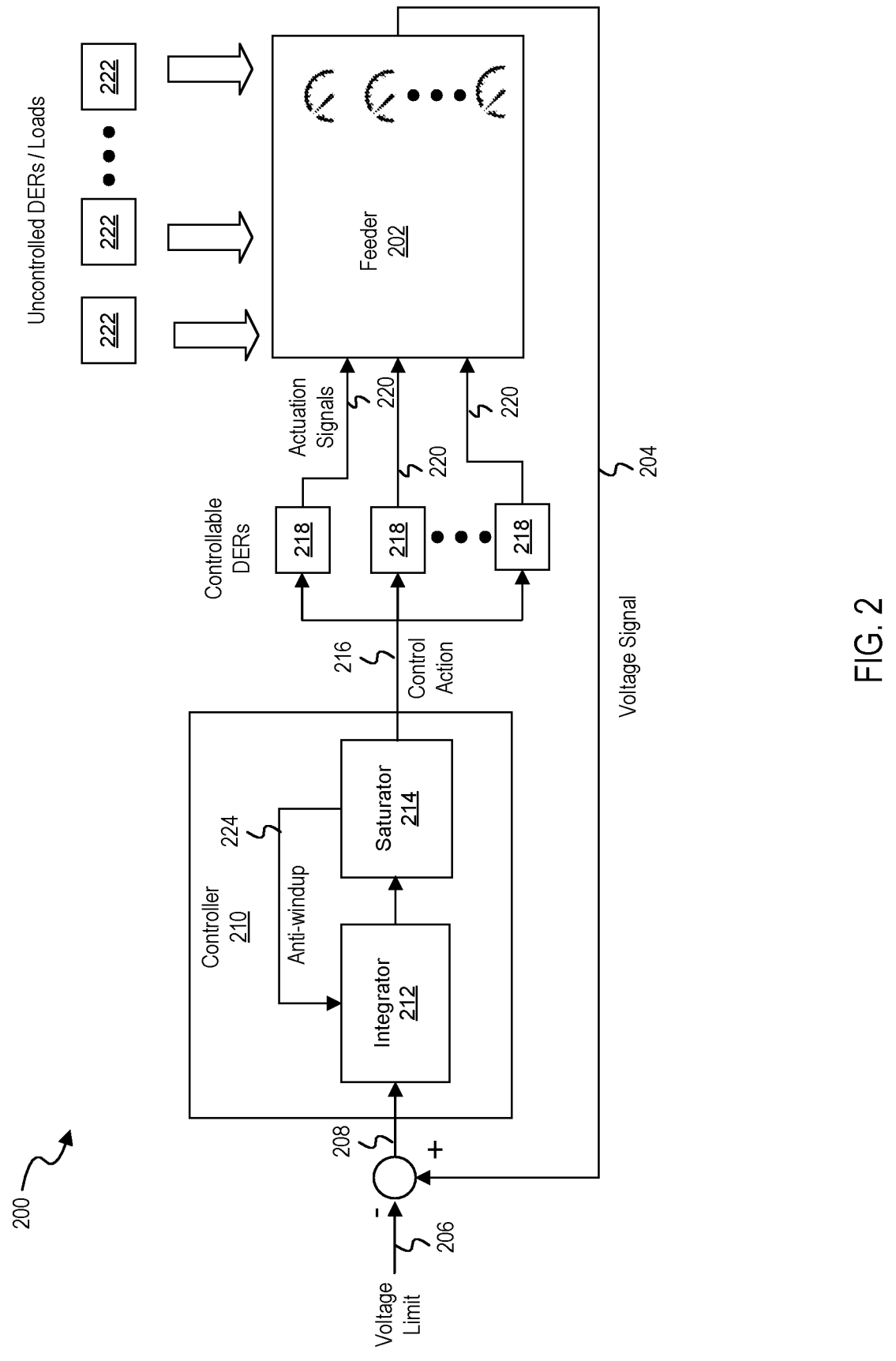
FIG. 2 is a block diagram illustrating a control structure for integral voltage control in a distribution feeder with controllable DERs according to an embodiment of the disclosure.

FIG. 2 illustrates a control structure 200 for integral voltage control in a distribution feeder 202 with controllable DERs 218 according to one embodiment. The feeder 202 may, for example, correspond to the feeder 104 shown in FIG. 1. The controllable DERs 218 may include, for example, any of the DERs 114, 116, 118, 120, 122 shown in FIG. 1.

In the control structure 200, a feedback control is implemented by a controller 210 including an integrator 212 that can generate a control action 216 based on a voltage signal 204 derived from measured or estimated voltages along the feeder 202, to counteract an error 208 between the voltage signal 204 and a voltage limit 206. Though not shown, in some embodiments, the controller 210 could include additional components, such as a proportional (P) and/or a derivative (D) component. In this case, the effects of the various components may be tuned by adjustment of controller parameters (e.g., integral gain/reset, proportional band/gain, derivative gain/rate) to achieve a predominantly integrating action, to realize the described control functionality. The controller 210 may thus be referred to as an integral controller (or I-controller) without loss of generality.

The controller 210, including components thereof, may be implemented in a computing environment in various ways, for example, as hardware and programming. The programming for the controller 210 may take the form of processor-executable instructions stored on non-transitory machine-readable storage mediums and the hardware for the modules may include processors to execute those instructions. The processing capability of the systems, devices, and modules described herein, including the controller 210 and its components, may be distributed among multiple system components, such as among multiple processors and memories, optionally including multiple distributed processing systems or cloud/network elements.

The integral voltage control according to the disclosed methodology is first illustrated in the context of overvoltage control. As shown, voltage in the feeder 202 may fluctuate due to uncontrolled DERs and/or loads 222. Overvoltage refers to a condition when the voltage at any point in the feeder 202 exceeds an upper voltage limit. Overvoltage may be caused, for example, by overgeneration from PV systems at certain hours of the day. High PV infeed along the feeder 202 may lead to a steadily increasing voltage from the feeder head to the feeder tail where the end customers are located.

As described above, voltages may be measured, in real-time via meters, or estimated, at different locations along the feeder, including the feeder head, feeder tail, distribution transformer, etc. The measured or estimated voltages may be utilized to generate a voltage signal 204 that defines a controlled variable. The I-controller 210 may work with a scalar input. Accordingly, in one embodiment the voltage signal 204 can be a maximum measured or estimated voltage along the feeder 202. Alternately, the voltage signal 204 can include a weighted sum of the measured or estimated voltages. Here, weights can be defined based on the locations of the measured or estimated voltages, e.g., with higher weight at the feeder tail or another location where overvoltage has been observed in the past.

The input to the I-controller 210 may include an error 208 resulting from a difference between the voltage signal 204 and the voltage limit 206. In particular, for overvoltage control, the error 208 may be arrived at by subtracting the voltage limit 206 from the voltage signal 204. In this case the voltage limit 206 may be a defined upper voltage limit. If the I-controller 210 should ensure that the actual upper voltage limit of the feeder 202 is never exceeded, even during the activation of the I-controller 210, the defined upper voltage limit 206 can be such that it is slightly lower than the actual limit. For example, if the actual upper voltage limit of the feeder 202 is 105% of the nominal feeder voltage, the defined upper voltage limit 206 may be 103% of the nominal feeder voltage. The error 208 may be multiplied by a gain, which defines how fast the I-controller 210 reacts to voltage violations. The integrator 212 may then integrate the result to generate as output a control action 216.

The control action 216 output by the I-controller 210 may be distributed among certain controllable DERs 218 that are capable of responding to it. The control action 216 may be a scalar, which may be distributed or split among the controllable DERs 218 in a number of ways. In a straightforward implementation, the control action 216 may be distributed equally among the controllable DERs 218. In this case, the control action 216 may be suitably communicated to the controllable DERs 218 by way of broadcasting. This may be particularly helpful to reduce the burden of massive point-to-point communication in real-time (e.g., every 2 seconds) with thousands of controllable DERs. In some embodiments, the control action 216 may be distributed based on defined weights among the controllable DERs 218. For example, the weights may be defined to provide more control action closer to the location of the high voltage, or closer to the feeder head, or based on some pricing incentives for the DER owners.

The controllable DERs 218, which are capable of responding at a given time, may generate actuation signals 220 based on their share of the control action 216. The actuation signals 220 may then be injected into the feeder 202 to reduce the overvoltage. There may be broadly two modes in which an individual controllable DER 218 can respond to a control action 216 to reduce overvoltage. A first mode may include absorbing reactive power from the feeder 202, e.g., via a DER inverter (if provided) to reduce the voltage locally. A second mode may include reducing active power infeed into the feeder 202, for example, by reducing the active power generation by PV systems or increasing the active power load (e.g., for BESS, EV charging systems, electrical heating and cooling systems, etc.). In one embodiment, a controllable DER 218 may initially respond to a control action 216 in the first mode until a reactive power limit of the DER 218 is reached, and, if the control action 216 continues to increase, subsequently switch to the second mode.

According to one embodiment, the response of an individual controllable DER 218 to the control action 216 may be determined locally at the respective DER 218. An individual controllable DER 218 may respond to the control action 216 in either one or both of the above-mentioned modes, depending on its capability. Also, a decision to switch from the first mode to the second mode may be made at the individual controllable DER 218, for example, by locally monitoring whether a reactive power limit of the DER 218 has been reached. In an alternate embodiment, the response of the controllable DERs 218 to the control action 216 may be determined centrally, for example, at the grid control system 132.

In some controllable DERs 218, instead of a continuous response to the control action 216 (as described above), a discrete response may be determined. For example, in one embodiment, the response to the control action 216 may include implementing a decision to delay or prevent the start of a high-load process by one or more controllable DERs 218, especially if the process cannot be interrupted. To illustrate, consider a feeder with many EV charging systems, in which every EV has a specific charging profile that it expects to follow once it starts charging. The response to the control action 216 in this case may be the decision as to whether a charging process at a particular EV charging system should start or not, or whether the start of a charging process should be delayed at the EV charging system (e.g., until another EV is fully charged at a different EV charging system).

A key feature of the described I-controller 210 is that it can increase the control action 216 such that the voltage signal 204 is reduced below the defined upper voltage limit 206. The I-controller 210 may start with an initial state in which both the error 208 and the control action 216 are "0". If the voltage signal 204 exceeds the defined upper voltage limit 206, the integrator 212 may integrate the error 208 to generate a control action 216. With time, the control action 216 increases due to the integrating action, thereby counteracting the high voltage. As soon as the control action 216 is strong enough to bring the voltage signal 204 to the defined upper voltage limit 206, the input to the I-controller 210 is "0". At this point, the integrator 212 stops integrating, and the control action 216 remains constant. If the voltage signal 204 falls below the defined upper voltage limit 206, the I-controller 210 receives a negative input and reduces the control action 216 until the voltage signal 204 reaches the defined upper voltage limit 206. At this point, the input to the I-controller 210 is once again "0", producing a constant control action 216. In this manner, the I-controller 210 can make the feeder voltage "surfing" at the voltage limit.

This "increase-the-control-action-until-limit-is-reached" property of the I-controller 210 can be particularly beneficial if not all controllable DERs 218 are responding. Following the example mentioned earlier concerning an EV charging system without a connected EV, or with an override command, the I-controller 210 may simply continue to increase the control action 216 for those DERs 218 that are actually responding to the control action 216, until the voltage falls below the limit.

The speed of increase of the control action 216 is determined by the gain of the integrator 212, which may be selected to be fast enough but not too aggressive. In one embodiment, the sensitivity of the measured or estimated voltages along the feeder 202 to the control action 216, i.e., the change in voltage signal 204 for a certain change in active/reactive power, could be learned, for example, via a machine learning model. The learning data may additionally include influencing factors such as time of the day, time of the week, weather conditions, etc. The learned sensitivity can be used to adjust the I-controller gain, either in a planning phase or online during operation.

In one embodiment, as shown in FIG. 2, the I-controller 210 may be provided with an output saturation via a saturator 214. In particular, the output of the I-controller may be saturated at "0", to ensure that the control action 216 is only positive. To illustrate this feature, consider a scenario in which the feeder voltage, which was previously maintained at the defined upper voltage limit 206, begins to reduce, e.g., due to reduction in PV infeed after sunset. The I-controller 210 then receives a negative input, which causes the control action 216 to decrease. With further decrease in the feeder voltage, e.g., due to further reduction in PV infeed, the control action 216 can get more and more negative. This scenario can be avoided by setting the output saturation to "0", ensuring that the control action is only positive. This can be particularly suitable for overvoltage control based on an upper voltage limit (as opposed to a setpoint), where it is often desirable to avoid a negative control action. To avoid the well-known wind-up effect of integral controllers with output saturation, the I-controller 210 may include an anti-windup feedback loop 224 (e.g., based on clamping or other known techniques) that stops the integrator 212 when the saturation is active.

The control structure shown in FIG. 2 can also be used for undervoltage control. Undervoltage refers to a condition when the voltage at any point in the feeder falls below a lower voltage limit. Undervoltage may be caused, for example, due to overload from EV charging systems or other large loads. In case of undervoltage control, the voltage signal 204 may include, for example, a minimum measured or estimated voltage along the feeder 202, or a weighted sum of the measured or estimated voltages along the feeder 202. The voltage limit 206 may be a defined lower voltage limit. To ensure that the actual lower voltage limit of the feeder 202 (e.g., 95% of nominal feeder voltage) is not violated, even during the activation of the I-controller 210, the defined lower voltage limit 206 can be such that it is slightly above the actual limit (e.g., 97% of the nominal feeder voltage).

To ensure a positive control action 216 to counteract an undervoltage, the sign of the summation in front of the I-controller 210 may be inverted, i.e., "+" for the lower voltage limit 206 and "−" for the voltage signal 204. The control action 216 may be distributed equally, or based on defined weights, among the controllable DERs 218 capable of responding to the control action 216 at any given time. There may be broadly two modes in which an individual controllable DER 218 can respond to a control action 216 to counteract undervoltage. A first mode may include injecting reactive power into the feeder 202, e.g., via a DER inverter (if provided) to increase the voltage locally. A second mode may include increasing active power in the feeder 202, for example, by reducing active power load in the feeder 202 (e.g., via BESS, EV charging systems, electrical heating and cooling systems, etc.) In one embodiment, a controllable DER 218 may initially respond to a control action 216 in the first mode until a reactive power limit of the DER 218 is reached, and, if the control action 216 continues to increase, subsequently switch to the second mode. The response to the control action 216 may be determined locally at individual controllable DERs 218. The response may also include implementing a decision to delay or prevent the start of a load process by one or more controllable DERs. In one embodiment, as shown, the I-controller 210 may be provided with output saturation at "0" and include an anti-windup feedback loop that stops the integrator 212 when the saturation is active, such that the I-controller 210 outputs only a positive control action. It should be noted that if the sign of the summation in front of the I-controller 210 were not inverted (i.e., remained as shown in FIG. 2), the control action 216 would be always negative, since the input to the I-controller 210 would be negative in case of an undervoltage. The output saturation at "0" may then ensure that control action is always negative.

In one embodiment, overvoltage control and undervoltage control may be implemented via separate I-controllers based on the defined upper and lower voltage limits respectively. Alternately, the controllers may be combined into a single control structure for implementing dead-band control within the defined upper and lower voltage limits. To illustrate, assume that the upper and lower voltage limits are the nominal voltage±5% (i.e., 105% and 95% nominal voltage respectively). In this case, a dead-band of ±5% may be created for the error 208. As long as the error 208 is within this dead-band, the output of the dead-band (i.e., input to integrator 212) is "0", such that the integrator 212 performs no action. If the error 208 exceeds +5%, the integrator 212 may receive a positive input and may start integrating, such that the control action 216 increases, taking more and more positive values, as described above. It may be desirable that the integrator output decreases when the voltage is below the upper voltage limit. One possible approach (among others) to ensure this may include "overriding" the dead-band if the integrator output is non-zero. If the error decreases below −5%, the integrator 212 may receive a negative input and may start integrating, such that the control action 216 increases in a negative direction, taking more and more negative values, until the error 208 stops at −5%. An output saturation at "0" and corresponding anti-windup feedback loop may be provided to ensure that the I-controller 210 outputs only a positive control action 216 for overvoltage control, and only a negative control action 216 for under-voltage control.

Separate I-controllers may also be used for controlling voltage per phase of the three-phase distribution system. Accordingly, in some embodiments, up to six I-controllers may be used for overvoltage and undervoltage control for three phases of power.

In a further embodiment, the disclosed integral voltage control can be combined with integral power control to avoid overloading of critical assets, such as distribution transformers. The control structure for integral power control may be similar to that described in FIG. 2. In this case, the voltage signal 204 may be replaced by a power signal derived from active power measurements or estimations at the critical asset(s). The voltage limit may be replaced by a defined power limit. The control action may be generated based on an error between the power signal and the defined power limit. The control actions of the integral power controller and the integral voltage controller (described above) may be combined to produce a combined control action. The combined control action may be distributed among the controllable DERs capable of responding to it, to generate actuation signals to control voltage and power along the feeder.

The embodiments of the present disclosure may be implemented with any combination of hardware and software. In addition, the embodiments of the present disclosure may be included in an article of manufacture (e.g., one or more computer program products) having, for example, a non-transitory computer-readable storage medium. The computer readable storage medium has embodied therein, for instance, computer readable program instructions for providing and facilitating the mechanisms of the embodiments of the present disclosure. The article of manufacture can be included as part of a computer system or sold separately.

The computer readable storage medium can include a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. Computer readable program instructions described herein can be downloaded to respective computing/processing devices from a computer readable storage medium or to an external computer or external storage device via a network, for example, the Internet, a local area network, a wide area network and/or a wireless network.

The system and processes of the figures are not exclusive. Other systems, processes and menus may be derived in accordance with the principles of the disclosure to accomplish the same objectives. Although this disclosure has been described with reference to particular embodiments, it is to be understood that the embodiments and variations shown and described herein are for illustration purposes only. Modifications to the current design may be implemented by those skilled in the art, without departing from the scope of the appended claims.

What is claimed is:

1. A method for controlling voltage in a feeder of a distribution system including a plurality of DERs by executing a feedback control, comprising:

generating a voltage signal using measured or estimated voltages at multiple locations along the feeder, determining an error between the voltage signal and a defined voltage limit, inputting the error to a controller comprising an integrator to generate a control action to counteract the error, and distributing the control action among at least some controllable DERs, from the plurality of DERs, that are capable of responding to the control action by generating actuation signals for absorbing reactive power from or injecting reactive power into the feeder, and/or for reducing active power or increasing active power in the feeder, wherein the control action continues to increase until the voltage signal reaches the defined voltage limit, to thereby control voltage in the feeder.

2. The method according to claim 1, wherein the voltage signal is a maximum measured or estimated voltage along the feeder, for overvoltage control, or a minimum measured or estimated voltage along the feeder, for undervoltage control.

3. The method according to claim 1, wherein the voltage signal includes a weighted sum of the measured or estimated voltages, wherein weights are defined based on the locations of the measured or estimated voltages.

4. The method according to claim 1, wherein the control action is distributed equally among the controllable DERs.

5. The method according to claim 4, wherein the control action is communicated to the controllable DERs by way of broadcasting.

6. The method according to claim 1, wherein the control action is distributed based on defined weights among the controllable DERs.

7. The method according to claim 1, wherein the response to the control action per controllable DER comprises initially responding in a first mode by generating actuation signals to absorb reactive power from or inject reactive power into the feeder until a defined reactive power limit of the DER is reached, and subsequently responding in a second mode by generating actuation signals to respectively reduce active power or increase active power in the feeder.

8. The method according to claim 1, wherein the response to the control action is determined locally at individual controllable DERs.

9. The method according to claim 1, wherein the response to the control action comprises implementing a decision to delay or prevent the start of a load process by one or more controllable DERs.

10. The method according to claim 1, wherein the controller is provided with output saturation at "0" and includes an anti-windup feedback loop that stops the integrator when the saturation is active, such that the controller outputs either only a positive control action or only a negative control action.

11. The method according to claim 1, comprising adjusting a gain of the integrator based on a learned sensitivity of the measured or estimated voltages along the feeder to the control action.

12. The method according to claim 1, comprising using separate controllers respectively for an overvoltage control based on a defined upper voltage limit and for an under-voltage control based on a defined lower voltage limit.

13. The method according to claim 1, comprising:
combining the control action with a further control action generated by a further controller based on an error between a power signal derived from measured or estimated active power at one or more critical assets of the distribution system and a defined power limit, to generate a combined control action, and
distributing the combined control action over the control-lable DERs to generate actuation signals to control voltage and power along the feeder.

14. A non-transitory computer-readable storage medium including instructions that, when processed by a computing system, configure the computing system to perform the method according to claim 1.

15. A computing system for voltage control in a distribution system, comprising:
one or more processors, and
memory storing instructions executable by the one or more processors to carry out a method according to claim 1.

* * * * *